US010893560B2

(12) United States Patent
Patil et al.

(10) Patent No.: US 10,893,560 B2
(45) Date of Patent: Jan. 12, 2021

(54) BEARER CONTROL FOR SECONDARY RADIO ACCESS TECHNOLOGY IN DUAL CONNECTIVITY NETWORKS

(71) Applicant: Verizon Patent and Licensing Inc., Arlington, VA (US)

(72) Inventors: Sudhakar Reddy Patil, Flower Mound, TX (US); Violeta Cakulev, Millburn, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 164 days.

(21) Appl. No.: 16/017,238

(22) Filed: Jun. 25, 2018

(65) Prior Publication Data

US 2019/0394820 A1 Dec. 26, 2019

(51) Int. Cl.
*H04W 76/15* (2018.01)
*H04W 60/00* (2009.01)
*H04W 48/20* (2009.01)

(52) U.S. Cl.
CPC ........... *H04W 76/15* (2018.02); *H04W 48/20* (2013.01); *H04W 60/00* (2013.01)

(58) Field of Classification Search
None
See application file for complete search history.

(56) References Cited

U.S. PATENT DOCUMENTS

| | | | |
|---|---|---|---|
| 2017/0104717 A1* | 4/2017 | Vesterinen | H04W 8/26 |
| 2018/0176839 A1* | 6/2018 | Ohara | H04W 16/32 |
| 2019/0069210 A1* | 2/2019 | Lee | H04W 36/0061 |
| 2019/0110241 A1* | 4/2019 | Jain | H04L 1/1864 |
| 2019/0253944 A1* | 8/2019 | Kim | H04W 36/0085 |

FOREIGN PATENT DOCUMENTS

EP 2205022 A1 * 7/2010 ........ H04W 36/0072

* cited by examiner

*Primary Examiner* — Saba Tsegaye

(57) ABSTRACT

A method for controlling bearers in a core network includes receiving, from a user equipment (UE) device, a request for access to network resources, where the core network is coupled with a primary radio access technology (RAT) and a secondary RAT. The method includes determining an access point name (APN) RAT access restriction in response to the received request, where the APN RAT access restriction associates an APN with a corresponding RAT, where the corresponding RAT comprises at least one of the primary RAT or the secondary RAT. The method also includes assigning a radio bearer based on the determined APN RAT access restriction, wherein the assigned radio bearer exchanges data via the corresponding RAT; and identifying, to a master node, the assigned radio bearer for exchanging data between the UE device and a device specified by the APN via the corresponding RAT.

20 Claims, 9 Drawing Sheets

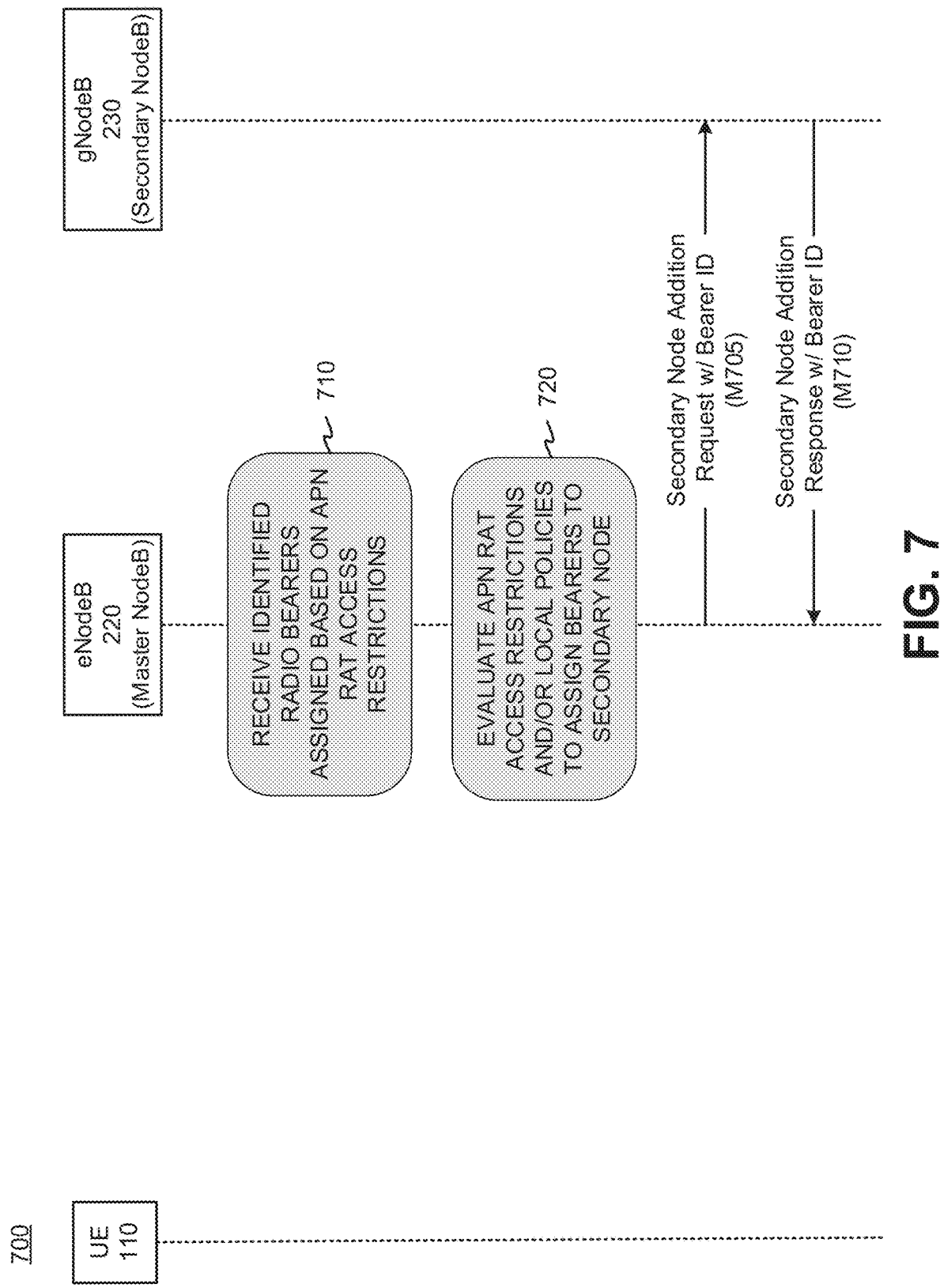

BEARER CONTROL FOR SECONDARY RADIO ACCESS TECHNOLOGY IN DUAL CONNECTIVITY NETWORKS

BACKGROUND

Long Term Evolution (LTE) is an existing mobile telecommunications standard for wireless communication. LTE networks include $4^{th}$ Generation (4G) wireless networks which are widely deployed throughout the world. LTE increased the capacity and speed from prior generations of wireless networks and simplified the network architecture. Next Generation wireless networks, such as $5^{th}$ Generation (5G) networks, have been proposed as the next evolution of wireless networks. Next Generation wireless networks are designed to increase data transfer rates, increase spectral efficiency, improve coverage, improve capacity, and reduce latency.

BRIEF DESCRIPTION OF THE DRAWINGS

FIG. 7 is a call flow diagram showing message flows establishing a master node eNodeB and a secondary node gNodeB for assigning bearers.

DETAILED DESCRIPTION OF THE PREFERRED EMBODIMENTS

Figure 1:
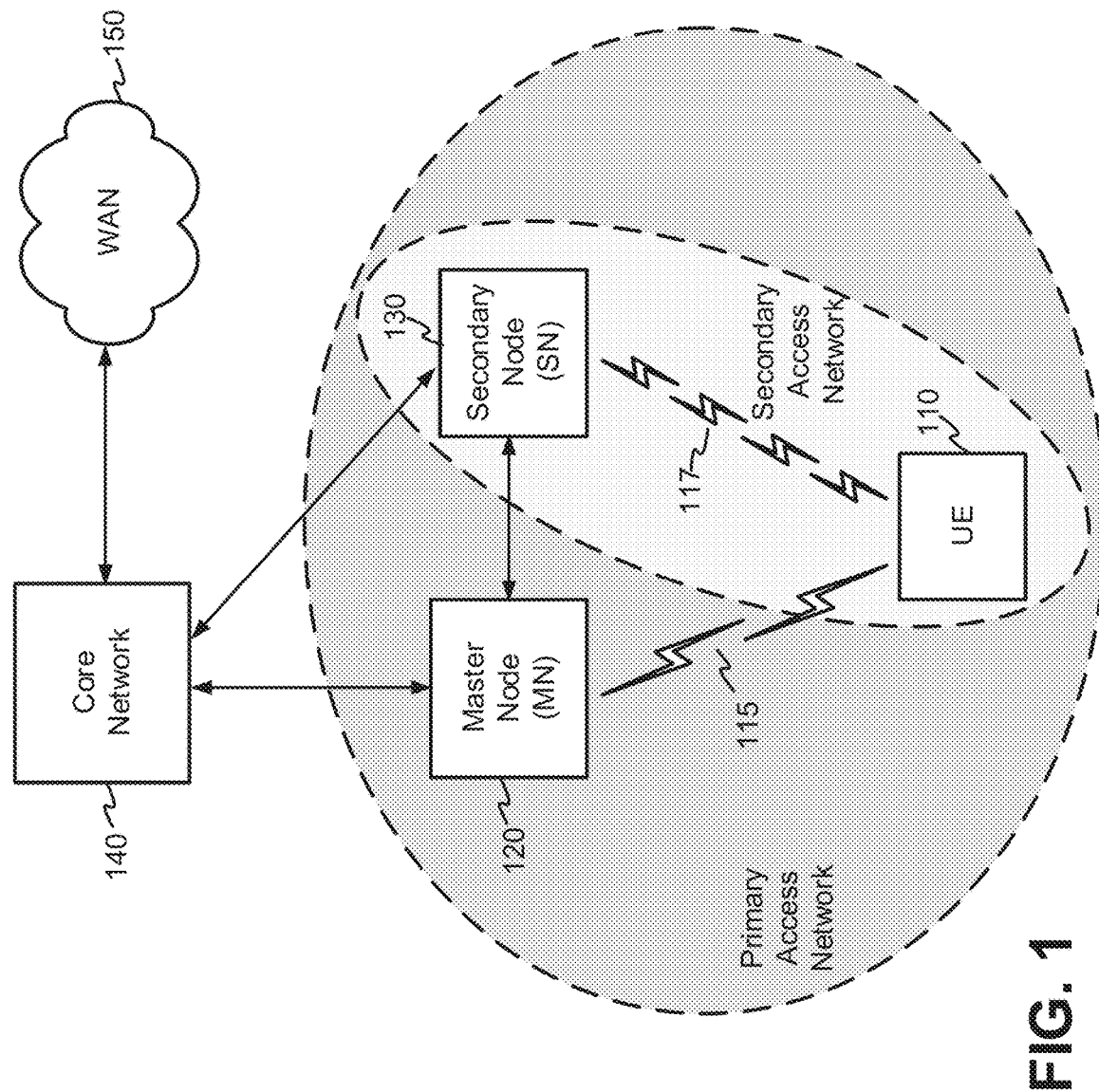
FIG. 1 is a diagram illustrating an exemplary network environment providing multiple radio access technologies (RATs) for dual wireless connectivity.

The following detailed description refers to the accompanying drawings. The same reference numbers in different drawings may identify the same or similar elements. The following detailed description does not limit the invention.

Embodiments described herein are directed to wireless communications systems which may efficiently activate bearers within multiple radio access technologies (multi-RATs) employing dual connectivity configurations. Dual connectivity configurations have been established to accomplish higher per-user throughput, mobility robustness, and improved load balancing. In a multi-RAT dual connectivity deployment, a user equipment (UE) device may be wirelessly connected simultaneously to two nodes: a master node (MN), which is associated with a primary RAT, and a secondary node (SN) which is associated with the secondary RAT.

In conventional dual connectivity configurations having multi-RAT deployments, such as, for example evolved universal mobile telecommunications system terrestrial radio, network (E-UTRAN) new radio-dual connectivity (EN-DC), Option 3×5G/New Radio (NR) support, etc., the radio bearers are set up for wireless communication by the master node. Initially, the radio bearers are established with a primary RAT associated with the MN. Once the radio bearers for the MN have been established, suitable radio bearers may then be transferred by the MN and reestablished for use with the SN. As used herein, the term "establish" is not restricted to initiating the radio bearers or setting up the radio bearers for the first time, but may also apply to reestablishing or activating the radio bearers upon a UE transitioning from an idle state to an active state (e.g., waking up from a power saving mode). Thus, in conventional dual connectivity radio networks, the MN is responsible for selecting bearers that could be served by the SN. The MN may use quality of service (QoS) class identifier (QCI) as the criteria in making such selection. However, the same QCI parameters may be utilized for bearers belonging to a number of different access point names (APNs), and all of the bearers sharing the same QCI may not be appropriate candidates to be served by the secondary node. Moreover, logic locally configured in the MN may be used to determine which bearers can be handled by the SN. However, because the core network has more information regarding the state of the network, it may be beneficial for the core network to control radio bearer assignments within the radio access network (RAN). The ability for the core network to control radio bearers is not currently available.

Embodiments herein provide the ability for the core network to control the radio bearer assignments in dual network configurations at the access point name (APN) level. Thus, the radio bearer assignments, which designate the RAT (e.g., 4G or 5G) in dual configuration networks, may be determined by network devices in the core network based on the APN. In alternative embodiments, the MN may determine radio bearer assignments in addition, or as an alternative, to the core network controlling the assignments of radio bearers. Such embodiments may include the MN using local logic based on QCI and/or allocation retention priority-priority level (ARP-PL) to determine which RAT is used to support a particular radio bearer.

FIG. 1 is a diagram illustrating an exemplary network environment 100 providing multiple radio access technologies (RATs) for dual wireless connectivity. Network environment 100 may include a user equipment (UE) device 110 (also referred to as UE 110), a master node (MN) 120, a secondary node (SN) 130, a core network 140, and a wide area network (WAN) 150. Network environment 100 may be divided into a primary access network and a secondary access network. The primary access network includes both wireless access nodes, MN 120 and SN 130, and UE 110. The secondary access network includes secondary node 130 and UE 110, and may be thought of as a subset of the primary access network. For ease of explanation, only one UE 110, one MN 120, and one SN 130 are illustrated as being connected to core network 140. However, any number of UEs 110, MNs 120, SNs 130, core networks 140 and/or other known network entities may be included in network environment 100.

As shown in FIG. 1, UE 110 may connect to core network 140, and in turn with WAN 150, through separate wireless access nodes using wireless channels having two different RATs. Specifically, UE 110 may wirelessly communicate through MN 120 over primary RAT 115, and wirelessly communicate though SN 130 over secondary RAT 117. UE 110 may communicate over each RAT 115, 117 separately or use both RATs 115, 117 simultaneously. To provide flexibility and improved performance, primary RAT 115 and secondary RAT 117 may be based on different wireless standards. For example, in one embodiment, core network 140 and MN 120 may operate in accordance with the LTE wireless standard (e.g., 4G and 4.5G), and SN 130 operates in accordance with the 5G wireless standard. Alternatively, in another embodiment, MN 120 may operate in accordance with the 5G wireless standard, and SN 130 may operate in accordance with the LTE (e.g., 4G and 4.5G) wireless standard. Other embodiments may operate in accordance with other technologies for public land mobile networks (PLMNs) and include other cellular network standards, and/or any other local and/or wide area wireless networking technologies.

MN 120 may control standard procedures for having the UE 110 initiate connections and interact with core network 140. For example, UE 110 may initiate procedures such as, for example, Attach, Tracking Area Update, Service Request, etc., through MN 120 to transition into a connected state with core network 140. During such procedures, radio bearers may be established for communicating over an air channel interface using a particular RAT 115, 117. As used herein, the term "bearer" may refer to a virtual network connection between two endpoints which provides a transport service for exchanging data having specified quality of service (QoS) attributes. The data exchanged over bearers, also referred to herein as "service data flows," may be associated with a particular service class (e.g., conversational class for voice data, streaming class for video data, interactive class for web browsing, etc.). The term "radio bearer" should be construed as a bearer which exchanges data via a wireless channel established by a particular RAT.

In an embodiment, core network 140 may determine which RAT 115, 117 is best suited for a particular bearer depending upon, for example, an APN RAT access restriction. As used herein, the term "APN RAT access restriction" may refer to a parameter used to configure communications with an APN in the core network which specifies how radio bearers can be assigned to one or more RATs for a given APN. Accordingly, the APN RAT access restriction may be passed to MN 120 by core network 120 for determining whether a radio bearer is assigned to primary RAT 115 or secondary RAT 117. In another embodiment, MN 120 may use local logic to determine radio bearer assignments to one or more RATs 115, 117 based on QCI and/or allocation retention priority-priority levels (ARP-PLs). The determination may be made, for example, based on measurement reports of channel conditions for each RAT 115, 117. MN 120 may initially only establish a first set of radio bearers associated with primary RAT 115 for communications with core network 140. After the first set of radio bearers are established, a second set of radio bearers associated with RAT 117 may be established between UE 110 and SN 130. Once radio bearers have been set up on RATs 115 and 117, UE 110 may wirelessly communicate over either RAT 115 or 117, or both RATs 115 and 117 simultaneously, to exchange service data flows with core network 140 and WAN 150.

MN 120 and SN 130 may each be directly connected to core network 140 to exchange service data flows within the network environment 100 and communicate with external resources (not shown) connected to WAN 150. MN 120 and SN 130 may also be connected directly to each other to provide a redundant path for service data flows in the event one of the wireless channels corresponding to RAT 115 or RAT 117 experiences a failure.

While the embodiment shown in FIG. 1 only shows two different RATs 115 and 117 in a dual connectivity scenario, additional RATs (i.e., three or more), which could be based on standards other than LTE and/or 5G (e.g., cellular and/or other wireless technologies such as WiFi), may be used to provide alternate approaches for wireless connectivity.

UE 110 may include any type of UE having multiple RAT capabilities, and thus communicate with multiple nodes using different wireless channels employing different types of RATs 115, 117. UE 110 may be a UE that may include, for example, a cellular radiotelephone, a smart phone, a tablet, a set-top box (STB), a mobile phone, any type of internet protocol (IP) communications device, a Voice over Internet Protocol (VoIP) device, a laptop computer, a palmtop computer, a wearable computer, a gaming device, a media player device, or a digital camera that includes communication capabilities (e.g., wireless communication mechanisms such as Wi-Fi), an Internet of Things (IoT) device, etc. In various embodiments, the RAT 115 and/or RAT 117 may be supported by any appropriate cellular radio access network (RAN), such as, for example, an LTE evolved universal terrestrial radio access network (eU-TRAN) and a 5G network. In other embodiments, the RATs 115 and/or 117 may include a local or wide area wireless network. A local area wireless network may include any type of WiFi (e.g., any IEEE 802.11x network, where x=a, b, c, g, and/or n). A wide area wireless network may include any type of wireless network covering larger areas, and may include a mesh network (e.g., IEEE 802.11s) and/or or a WiMAX IEEE 802.16.

MN 120 may be configured to operate in multiple coverage modes and/or using one or more wireless channels based on different RATs in accordance with one or more known wireless standards. MN 120 may be reconfigurable with respect to improvements of existing standards and future standards for any type of radio access network, and can be compatible with known wireless standards. Such standards may include, for example, LTE, LTE Advanced, 5G, etc. In some embodiments, MN 120 may be a wireless access point which can service any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. MN 120 may also have a direct connection with SN 130 to provide a failover in the event a wireless channel associated with RAT 115 or 117 becomes inoperable.

SN 120 may be configured to operate in multiple coverage modes and/or using one or more wireless channels based on different RATs in accordance with one or more known wireless standards. Secondary node 120 may typically operate using a different type of RAT 117 than RAT 115 used by MN 120. SN 130 may be reconfigurable with respect to improvements of existing standards and future standards for any type of radio access network, and can be compatible with known wireless standards. Such standards may include, for example, LTE, LTE Advanced, 5G, etc. In some embodiments, SN 130 may be a wireless access point which can service any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. SN 130 may also have a direct connection with MN 120 to provide a failover in the event a wireless channel associated with RAT 115 or 117 becomes inoperable.

Core network 140 may be a core networking infrastructure that provides mobility management, session management, authentication, and packet transport to support UE 110, MN 120, and SN 130 wireless communication using a dual connectivity, multi-RAT configuration. Core network 140 may further provide access to WAN 150. Core network 140 may be compatible with known wireless standards which may include, for example, LTE, LTE Advanced, 3GPP 5G, Global System for Mobile Communications (GSM), Universal Mobile Telecommunications System (UMTS), IS-2000, etc.

WAN 150 may be any type of wide area network connecting backhaul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Figure 2:
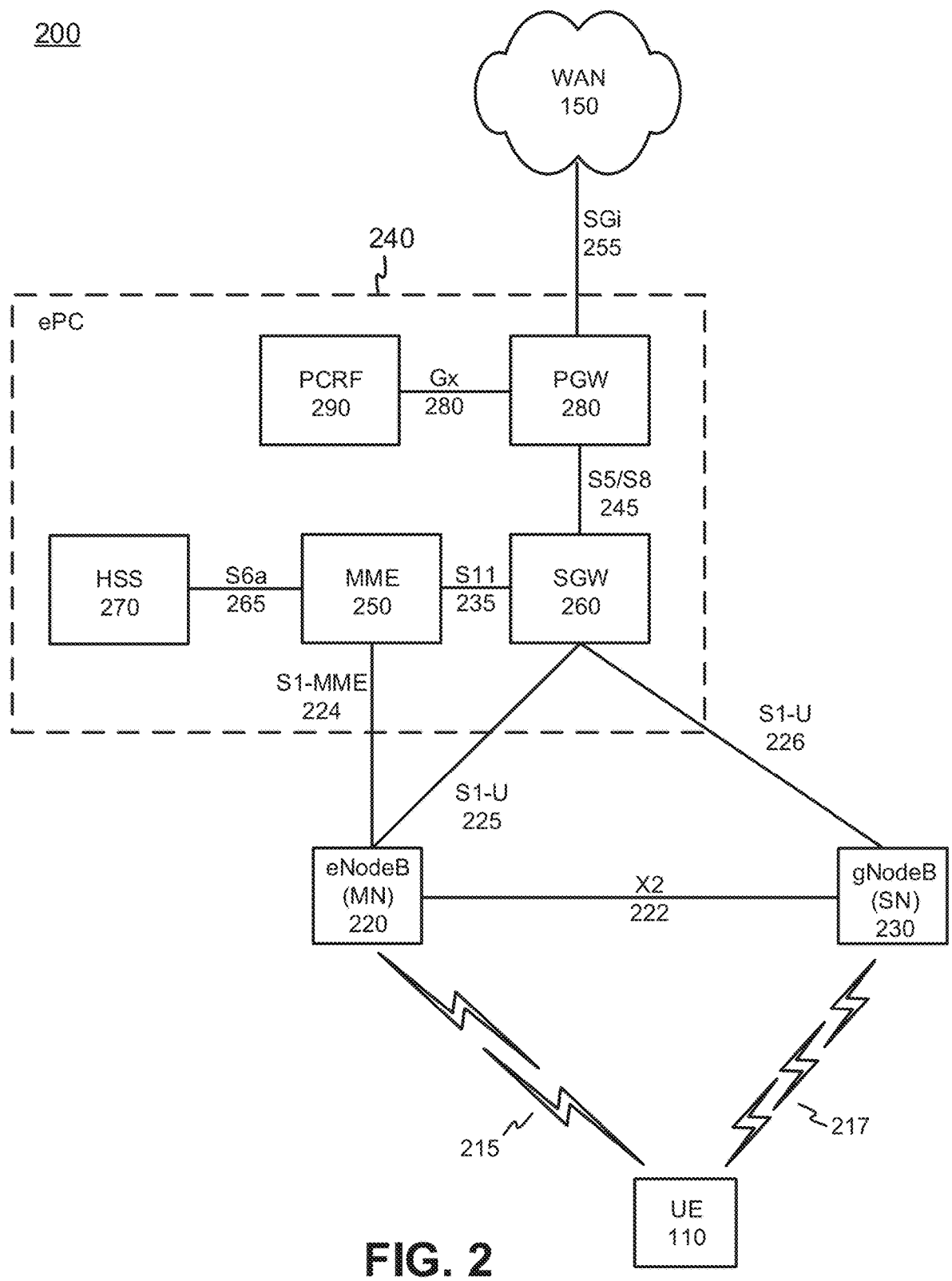
FIG. 2 is a block diagram of an exemplary networking system having a primary access network based on an LTE standard and a secondary access network based on a 5G standard.

FIG. 2 is a block diagram of an exemplary networking system 200 having the primary access network based on the LTE standard and the secondary access network based on the 5G standard. Networking system 200 may include an LTE network which is part of a multi-RAT radio access network having eNodeB 220 serving as a master node (MN). The secondary access network may include a gNodeB 230 serving as a secondary node (SN). UE 110 and eNodeB 220 may exchange data over a wireless channel that is a primary RAT 215 based on LTE air channel interface protocols, while UE 110 and gNodeB 230 may exchange data over a wireless channel that is a secondary RAT 217 based on 5G air channel interface protocols. UE 110 may be configured to operate with both RATs 215, 217, and can communication data simultaneously over each respective RAT.

In the embodiment shown in FIG. 2, core network 140 may be implemented as an evolved Packet Core (ePC) 240 which works in conjunction with an evolved Universal Mobile Telecommunications System (UMTS) Terrestrial Network (eUTRAN) that includes at least one eNodeB 220. Networking system 200 may further include an Internet Protocol (IP) network, which may be embodied separately or included in a backhaul network (not shown) and/or WAN 150.

EPC 240 may include one or more devices that are physical and/or logical entities interconnected via standardized interfaces. EPC 240 provides wireless packet-switched services and wireless IP connectivity to user devices to provide, for example, data, voice, and/or multimedia services. EPC 240 may further include a mobility management entity (MME) 250, a serving gateway (SGW) 260, a home subscriber server (HSS) 270, a packet data network gateway (PGW) 280, and a Policy and Charging Rules Function (PCRF) 290. It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 and gNodeB 230 may include one or more devices and other components having functionality that allows UE 110 to wirelessly connect the respective RAT 215, 217 of eNodeB 220 and gNodeB 230, respectively. ENodeB 220 may interface with ePC 240 via a S1 interface, which may be split into a control plane S1-MME interface 224 and a data plane S1-U interface 225. EnodeB 220 may interface with MME 250 via S1-MME interface 224, and interface with SGW 260 via S1-U interface 225. GNodeB 230 may interface with ePC 240 via a data plane S1-U interface 226. S1-U interface 226 may be implemented, for example, using GTP. S1-MME interface 224 may be implemented, for example, with a protocol stack that includes a Non-Access Stratum (NAS) protocol and/or Stream Control Transmission Protocol (SCTP).

ENodeB 220 and gNodeB 230 may communicate directly over an X2 interface 222 that may serve, for example, as a failover data connection in the event one of the wireless channels associated with RATs 215, 217 fails. The X2 interface 222 may use a protocol that tunnels end-user packets between eNodeB 220 and gNodeB 230, where the tunneling function supports the identification of packets with the tunnels and packet loss management. X2 interface 222 may use GTP-U over user datagram protocol (UDP) or internet protocol (IP) as the transport layer protocol.

MME 250 may implement control plane processing for both the primary access network and the secondary access network. For example, through either eNodeB 220 or gNodeB 230, MME 250 may implement tracking and paging procedures for UE 110, may activate and deactivate bearers for UE 110, and may authenticate a user of UE 110 to provide normal coverage service for operating in normal UE device mode. MME 250 may also select a particular SGW 260 for a particular UE 110. MME 250 may interface with other MMEs (not shown) in ePC 240 and may send and receive information associated with UEs 110, which may allow one MME 250 to take over control plane processing of UEs serviced by another MME 250, if the other MME becomes unavailable.

SGW 260 may provide an access point to and from UE 110, may handle forwarding of data packets for UE 110, and may act as a local anchor point during handover procedures between eNodeBs 220 and gNodeB 230. SGW 260 may interface with PGW 280 through an S5/S8 interface 245. S5/S8 interface 245 may be implemented, for example, using GTP.

PGW 280 may function as a gateway to WAN 150 through a SGi interface 255. WAN 150, which may provide various services (e.g., over the top voice services) to UE 110. A particular UE 110, while connected to a single SGW 260, may be connected to multiple PGWs 280, one for each packet network with which UE 110 communicates.

Alternatively, UE 110 may exchange data with WAN 150 though a WiFi wireless access point (WAP) (not shown). The WiFi WAP may be part of a local area network, and access WAN 150 through a wired connection via a router. Alternatively, the WiFi WAP may be part of a mesh network (e.g., 802.11s). The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular UE 110. S11 interface 235 may be activated when MME 250 needs to communicate with SGW 260, such as when the particular UE 110 attaches to ePC 240, when bearers need to be added or modified for an existing session for the particular UE 110, when a connection to a new PGW 280 needs to be created, or during a handover procedure (e.g., when the particular UE 110 needs to switch to a different SGW 260).

HSS 270 may store information associated with UEs 110 and/or information associated with users of UEs 110. For example, HSS 270 may store user profiles that include registration, authentication, and access authorization information. MME 250 may communicate with HSS 270 through an S6a interface 265. S6a interface 265 may be implemented, for example, using a Diameter protocol.

PCRF 290 provides policy control decision and flow based charging control functionalities. PCRF 290 may provide network control regarding service data flow detection, gating, QoS and flow based charging, etc. PCRF 290 may determine how a certain service data flow shall be treated, and may ensure that user plane traffic mapping and treatment is in accordance with a user's subscription profile. PCRF 290 may communicate with PGW 280 using a Gx interface 280. Gx interface 280 may be implemented, for example, using a Diameter protocol.

During various procedures consistent with the operation of an LTE network, such as, for example, an Attach procedure, a Tracking Area Update, a Service Request etc., UE 110 may employ normal procedures and utilize eNodeB 220 to move into a connected state with the LTE network. For this state, eNodeB 220 may establish radio bearers that are designated by ePC 240 based on APN RAT access restrictions. Typically, within ePC 240, Internet and internet multimedia system (IMS) access point name (APN) related bearers are established, so eNodeB 220 may establish radio bearers to exchange service data flows with UE 110. In the embodiment shown in FIG. 2, eNodeB 220 may initially establish radio bearers which will be used only by primary RAT 215 for wireless communication with UE 110. Once the radio bearers for use by the eNodeB 220 are established based on directives from ePC 240, eNodeB 220 may then configure UE 110 for operation with radio bearers with gNodeB 230 on secondary RAT 217 based on directives from ePC 240. In other embodiments, radio bearers with gNodeB 230 may be initially established based on directives from ePC 240. Alternatively, eNodeB may use local logic, based on QCI and/or ARP-PL, to assign radio bearers to RATs 215, 217. Details of the messages exchanged for setting up radio bearers on RAT 215 and 217 during an attach procedure are described below in relation to FIGS. 6A-6B.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
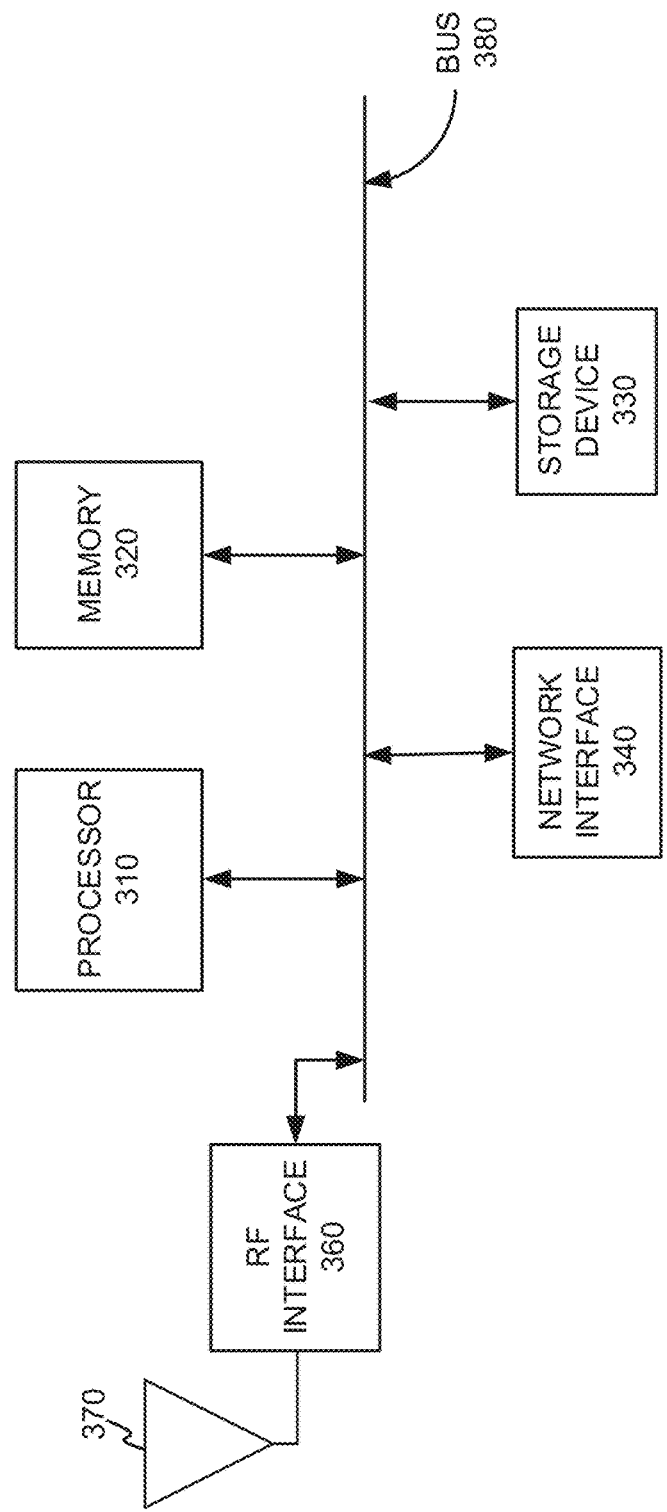
FIG. 3 is a block diagram showing exemplary components of an eNodeB according to an embodiment.

FIG. 3 is a block diagram showing exemplary components of an eNodeB 220 according to an embodiment. ENodeB 220 may provide connectivity to UE 110 over an air channel interface using RAT 215 based on wireless protocols in accordance with LTE, LTE Advanced, 3GPP 4G and/or 4.5G. ENodeB 220 may provide wireless network connectivity to devices connected to ePC 240 in a dual connectivity, multi-RAT configuration, and to network devices connected to wide area networks (e.g., the Internet). As shown in FIG. 3, eNodeB 220 may include a processor 310, a memory 320, a storage device 330, a network interface 340, a radio frequency (RF) interface 360, and an antenna 370. A bus 380 may interconnect the components of eNodeB 220 to exchange data and/or analog signals.

Processor 310 may include one or more processors, microprocessors, application specific integrated circuits (ASICs), field programmable gate arrays (FPGAs), and/or other processing logic. Processor 310 may control operation of eNodeB 220 and its components and perform signal processing operations, for example, the digital modulation and demodulation of signals. Processor 310 may also perform processing to facilitate communications over the backhaul network and WAN 150. Processor 310 may also operate in the non-access stratum and thus facilitate signaling and coordination with network devices in wireless access network to manage the establishment of communication sessions and for maintaining continuous communications. Processor 310 may include a modem (not shown) and function together to facilitate the operations of eNodeB 220 in accordance with a variety of wireless communication protocols.

Memory 320 may include a random access memory (RAM) or another type of dynamic storage device, a read only memory (ROM) or another type of static storage device, a removable memory card, and/or another type of memory to store data and instructions that may be used by processor 310. Storage device 330 may include any type of mass storage device such as a hard disk, a solid state disk, etc., for long term and/or scratch storage of data and instructions used by processor 310.

Network interface 340 may include a logical component that includes input and/or output ports, input and/or output systems, and/or other input and output components that facilitate the transmission of data to other devices via a backhaul link. For example, network interface 340 may include a network interface card (e.g., Ethernet card) for wired communications and/or a wireless network interface (e.g., a WiFi) card for wireless communications.

RF interface 360 may include one or more RF transceivers that enable eNodeB 220 to communicate with UEs 110 via wireless communications using RAT 115. An RF transceiver may include an RF transmitter that receives signals to be transmitted wirelessly and performs signal processing on the signals before providing the signals to antenna 370, and an RF receiver that receives signals from antenna 370 and performs RF signal processing on the received signals before providing the received signals to processor 310. For example, the RF transceiver may perform analog-to-digital and digital-to-analog conversion, analog and/or digital modulation and demodulation, up-conversion and down-conversion, and/or amplification of signals.

Antenna 370 may include one or more antennas to transmit and/or receive RF signals over the air. Antenna assembly 370 may, for example, receive RF signals from network interface 340 and transmit the signals over the air, and receive RF signals over the air and provide them to network interface 340.

As described herein, eNodeB 220 may perform certain operations in response to processor 310 executing software instructions contained in a computer-readable medium, such as memory 320 and/or storage device 330. A computer-readable medium may be defined as a non-transitory memory device. A non-transitory memory device may include memory space within a single physical memory device or spread across multiple physical memory devices. The software instructions may be read into memory 320 from another computer-readable medium or from another device via network interface 340. Alternatively, hardwired circuitry may be used in place of, or in combination with, software instructions to implement processes described herein. Thus, implementations described herein are not limited to any specific combination of hardware circuitry and software.

Although FIG. 3 shows example components of eNodeB 220, in other implementations, eNodeB 220 may include fewer components, different components, differently arranged components, or additional components than those depicted in FIG. 3. Additionally or alternatively, one or more components of eNodeB 220 may perform the tasks described as being performed by one or more other components of eNodeB 220.

Figure 4:
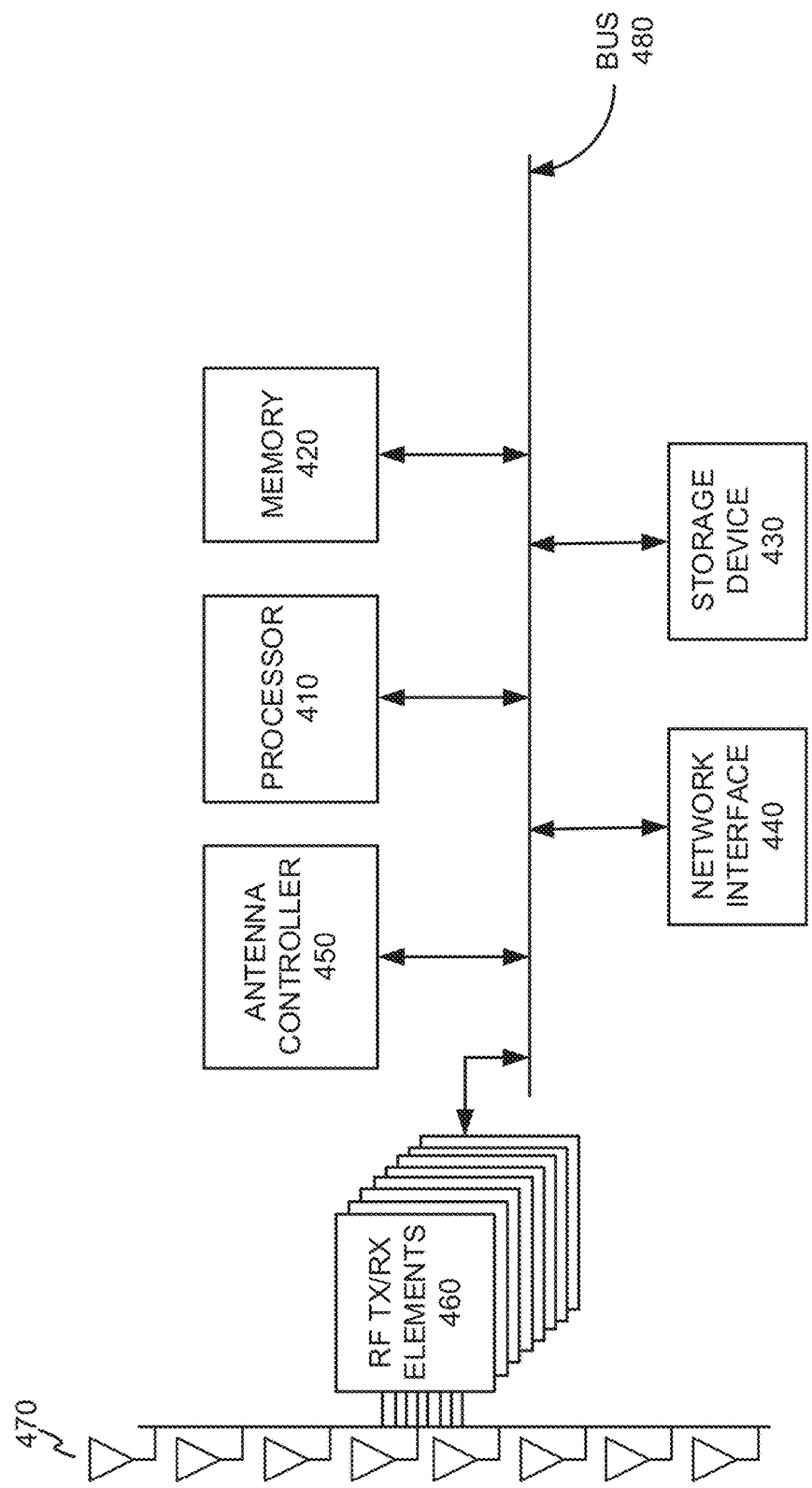
FIG. 4 is a is a block diagram showing exemplary components of an gNodeB according to an embodiment.

FIG. 4 is a block diagram showing exemplary components of a gNodeB 230 according to an embodiment. GNodeB 230 may provide connectivity to UE 110 over an air channel interface using RAT 217 based on wireless protocols in accordance with 3GPP 5G. GNodeB 230 may further provide wireless and/or wireless network connectivity to other devices connected to ePC 240 in a dual connectivity, multi-RAT configuration, and to network devices connected to wide area networks (e.g., the Internet). GNodeB 230 may include a processor 410, a memory 420, a storage device 430, a network interface 440, an antenna controller 450, RF transmit/receive (TX/RX) elements 460, and an antenna array 470. A bus 480 may interconnect the components of gNodeB 230 to exchange data and/or analog signals.

Processor 410 may include one or more processors, microprocessors, application specific integrated circuits (ASICs), field programmable gate arrays (FPGAs), and/or other processing logic that may interpret and execute instructions and/or low level logic. Processor 410 may control operation of gNodeB 230 and its components. Processor 410 may also perform various communications and signal processing operations allowing for gNodeB 230 to efficiently communicate over the wireless network. Processor 410 may also perform processing to facilitate communications over the backhaul network and WAN 150. Processor 410 may also operate in the non-access stratum and thus facilitate signaling and coordination with network devices in wireless access network to manage the establishment of communication sessions and for maintaining continuous communications. Processor 410 may include a modem (not shown) and function together to facilitate the operations of gNodeB 230 in accordance with a variety of wireless communication protocols.

Memory 420 may include a random access memory (RAM) or another type of dynamic storage device to store data and instructions that may be used by processor 410. Storage device 430 may include a persistent solid state read/write device, a magnetic, and/or optical recording medium and its corresponding drive.

Network interface 440 may include a logical component that includes input and/or output ports, input and/or output systems, and/or other input and output components that facilitate the transmission of data to other devices via a backhaul link. For example, network interface 440 may include a network interface card (e.g., Ethernet card) for wired communications and/or a wireless network interface (e.g., a WiFi) card for wireless communications.

Antenna controller 450 may accept data and/or commands (e.g. pointing and/or beamforming commands) from processor 410. Antenna controller 450 may perform transmit (TX) multiple input multiple output (MIMO) encoding to produce multiple channels of data, for a set of the antenna elements in antenna array 470, which may be transmitted over a downlink channel. Signals which have been received over an uplink channel via antenna array 470 may be decoded using receive (RX) MIMO decoding to combine streams into fewer data channels or a single received channel. Antenna controller 450 may further apply beamforming weights (which perform relative phase, frequency, and amplitude modulations between the antenna elements) on the transmit data streams to electronically adjust the transmit antenna pattern. Additionally, antenna controller 450 apply beamforming weights on the receive data streams to electronically adjust the receive antenna pattern.

RF TX/RX elements 460 may include discreet RF elements to amplify, frequency demodulate (e.g., down convert) analog channels received via an uplink channel through antenna array 470, and convert the analog channels to received digital streams using analog to digital converters. The received digital streams may be passed to antenna controller 450 which may further perform RX MIMO processing to combine MIMO streams. RF TX/RX elements 460 may further process transmit digital streams, which may be TX MIMO encoded by antenna controller 450 prior to being converted to analog signals using digital to analog converters. The analog signals may be frequency upconverted and amplified for transmission at RF TX/RX elements 460, and subsequently radiated by antenna array 470, over a downlink channel.

Antenna array 470 may include a number of antenna elements in order to serve multiple sectors and/or to provide various antenna characteristics (e.g., antenna beam width, gain, side lobe control, etc.) appropriate for gNodeB 230 operations. The antenna elements may have independent channels that may be used for electronic adjustments of both the transmit and receive antenna patterns, and/or also for transmit and/or receive MIMO processing to improve wireless channel reliability and/or throughput. In an embodiment, antenna elements 470 may be "grouped" (though physical and/or electronic arrangement) and designated for communication with UEs 110 within a particular sector of gNodeB's 230 overall coverage. The sector may be divided into angular segments (measured in a horizontal plane) pointing in different directions in order to distribute coverage for gNodeB 230. For example, antenna elements 470 may be grouped in a triangular arrangement so each side of the triangle serves a 120-degree sector. The antenna pattern, generated by the antenna elements associated with a particular sector, may be characterized by angles (e.g., azimuth and elevation) defined by a sector reference direction for the sector. The sector reference direction may be specified by a vector extending from a reference point associated with the sector.

As described herein, gNodeB 230 may perform certain operations in response to processor 410 executing software instructions contained in a computer-readable medium, such as memory 420 and or storage device 430. A computer-readable medium may be defined as a non-transitory memory device. A non-transitory memory device may include memory space within a single physical memory device or spread across multiple physical memory devices. The software instructions may be read into memory 420 from another computer-readable medium or from another device via network interface 440. The software instructions contained in memory 420 may cause processor 410 to perform processes which include enabling both normal coverage mode and enhanced coverage mode. Alternatively, hardwired circuitry may be used in place of, or in combination with, software instructions to implement processes described herein. Thus, implementations described herein are not limited to any specific combination of hardware circuitry and software.

Although FIG. 4 shows example components of gNodeB 230, in other implementations, gNodeB 230 may include fewer components, different components, differently arranged components, or additional components than those depicted in FIG. 4. Additionally, or alternatively, one or more components of gNodeB 230 may perform the tasks described as being performed by one or more other components of eNodeB 230.

Figure 5:
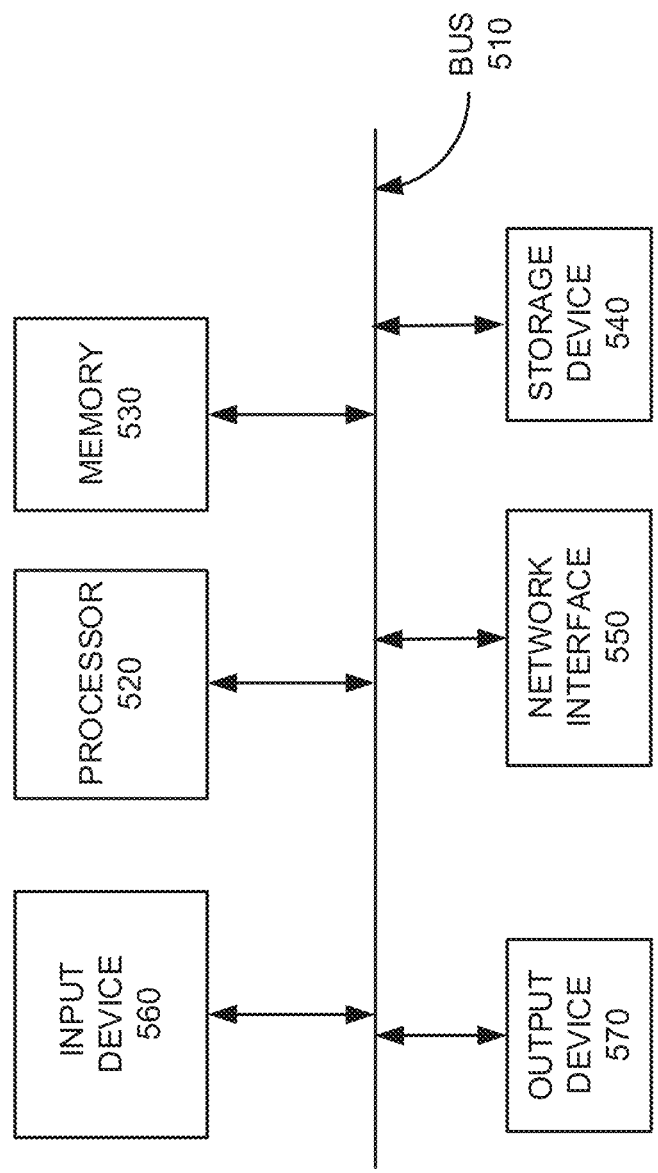
FIG. 5 is a block diagram showing exemplary components of a network device according to an embodiment.

FIG. 5 is a block diagram showing exemplary components of a network device 500 according to an embodiment. Embodiments may include network device 500 residing in network core 140. For example, network device 500 may include MME 250, HSS 270, PCRF 290, PGW 280 and/or SGW 260. Network device 500 may include a bus 510, a processor 520, a memory 530, storage device 540, a network interface 550, input device 560, and an output device 570. In some implementations, UE 110 may be similarly configured as device 500.

Bus 510 includes a path that permits communication among the components of network device 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic. For example, processor 520 may be an x86 based CPU, and may use any operating system, which may include varieties of the Windows, UNIX, and/or Linux operating systems. Processor 520 may also use high-level analysis software packages and/or custom software written in any programming and/or scripting languages for interacting with other network entities are communicatively coupled to WAN 150.

Memory 530 may include any type of dynamic storage device that may store information and/or instructions, for execution by processor 520, and/or any type of non-volatile storage device that may store information for use by processor 520. For example, memory 530 may include a random access memory (RAM) or another type of dynamic storage device, a read only memory (ROM) device or another type of static storage device, and/or a removable form of memory, such as a flash memory. Storage device 540 may include any type of on-board device suitable for storing large amounts of data, and may include one or more hard drives, solid state drives, and/or various types of redundant array of independent disks (RAID) arrays.

Input device 550, which may be optional, can allow an operator to input information into network device 500, if required. Input device 550 may include, for example, a keyboard, a mouse, a pen, a microphone, a remote control, an audio capture device, an image and/or video capture device, a touch-screen display, and/or another type of input device. In some embodiments, network device 500 may be managed remotely and may not include input device 550. Output device 560 may output information to an operator of network device 500. Output device 560 may include a display (such as a liquid crystal display (LCD)), a printer, a speaker, and/or another type of output device. In some embodiments, network device 500 may be managed remotely and may not include output device 560.

Network interface 550 may include a transceiver that enables network device 500 to communicate with other devices and/or systems in network environment 100. Network interface 550 may be configured to exchange data with WAN 150 over wired communications (e.g., conductive wire, twisted pair cable, coaxial cable, transmission line, fiber optic cable, and/or waveguide, etc.), or a combination of wireless. In other embodiments, network interface 550 may interface with wide area network 150 using a wireless communications channel, such as, for example, radio frequency (RF), infrared, and/or visual optics, etc. Network interface 550 may include a transmitter that converts baseband signals to RF signals and/or a receiver that converts RF signals to baseband signals. Network interface 550 may be coupled to one or more antennas for transmitting and receiving RF signals. Network interface 550 may include a logical component that includes input and/or output ports, input and/or output systems, and/or other input and output components that facilitate the transmission/reception of data to/from other devices. For example, network interface 550 may include a network interface card (e.g., Ethernet card) for wired communications and/or a wireless network interface (e.g., a WiFi) card for wireless communications. Network interface 550 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, network device 500 may perform certain operations relating to facilitating secure access to sponsored content. Network device 500 may perform these operations in response to processor 520 executing software instructions contained in a computer-readable medium, such as memory 530 and/or storage device 540. The software instructions may be read into memory 530 from another computer-readable medium or from another device. The software instructions contained in memory 530 may cause processor 520 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuity may perform the process exemplified by the flow chart shown in FIG. 8.

Although FIG. 5 shows exemplary components of network device 500, in other implementations, network device 500 may include fewer components, different components, additional components, or differently arranged components than depicted in FIG. 5.

Figure 6A:
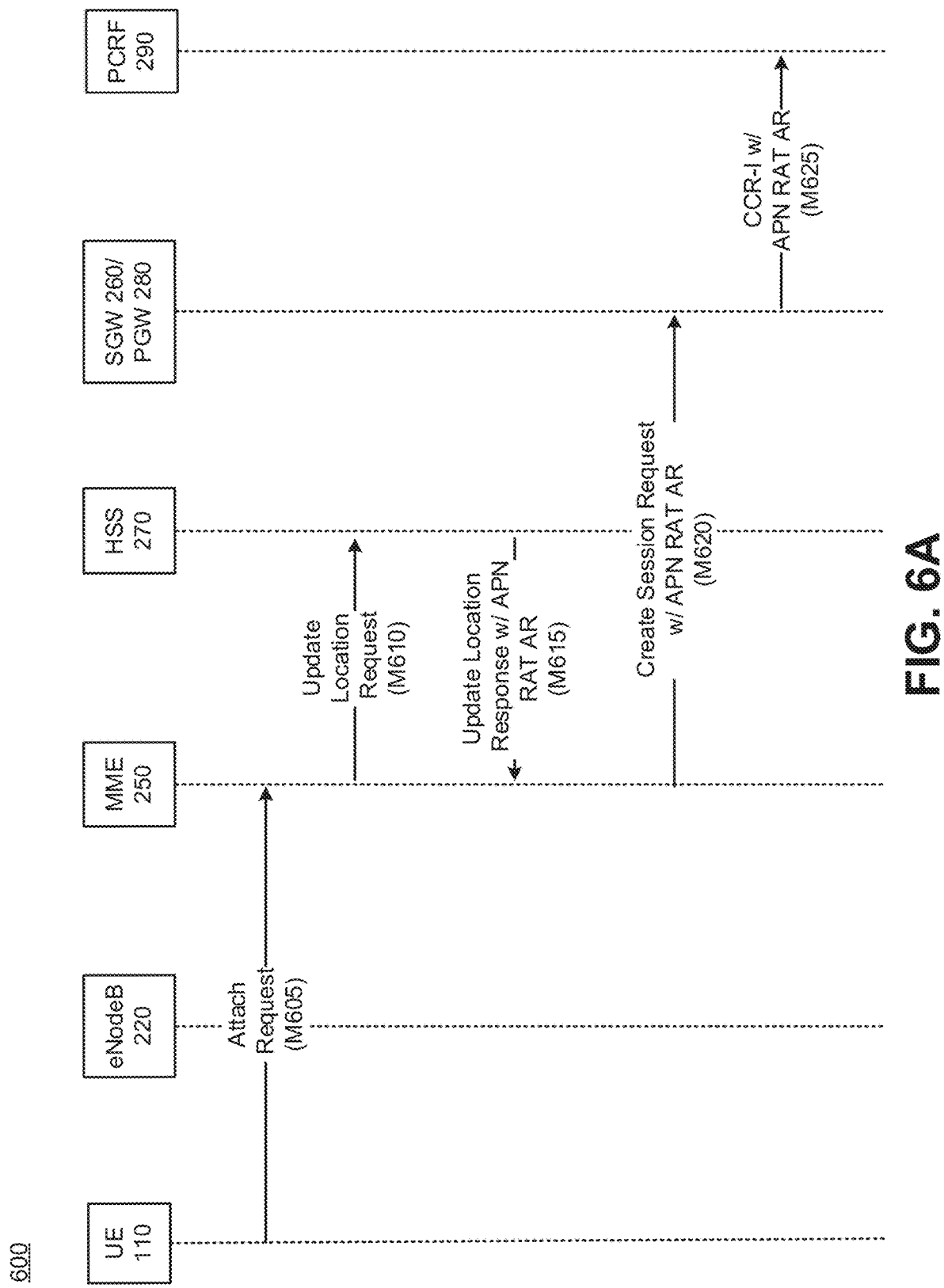
FIGS. 6A and 6B are diagrams showing exemplary message flows within a networking system for controlling the assignment of a default radio bearer during an attach procedure.
Figure 6B:
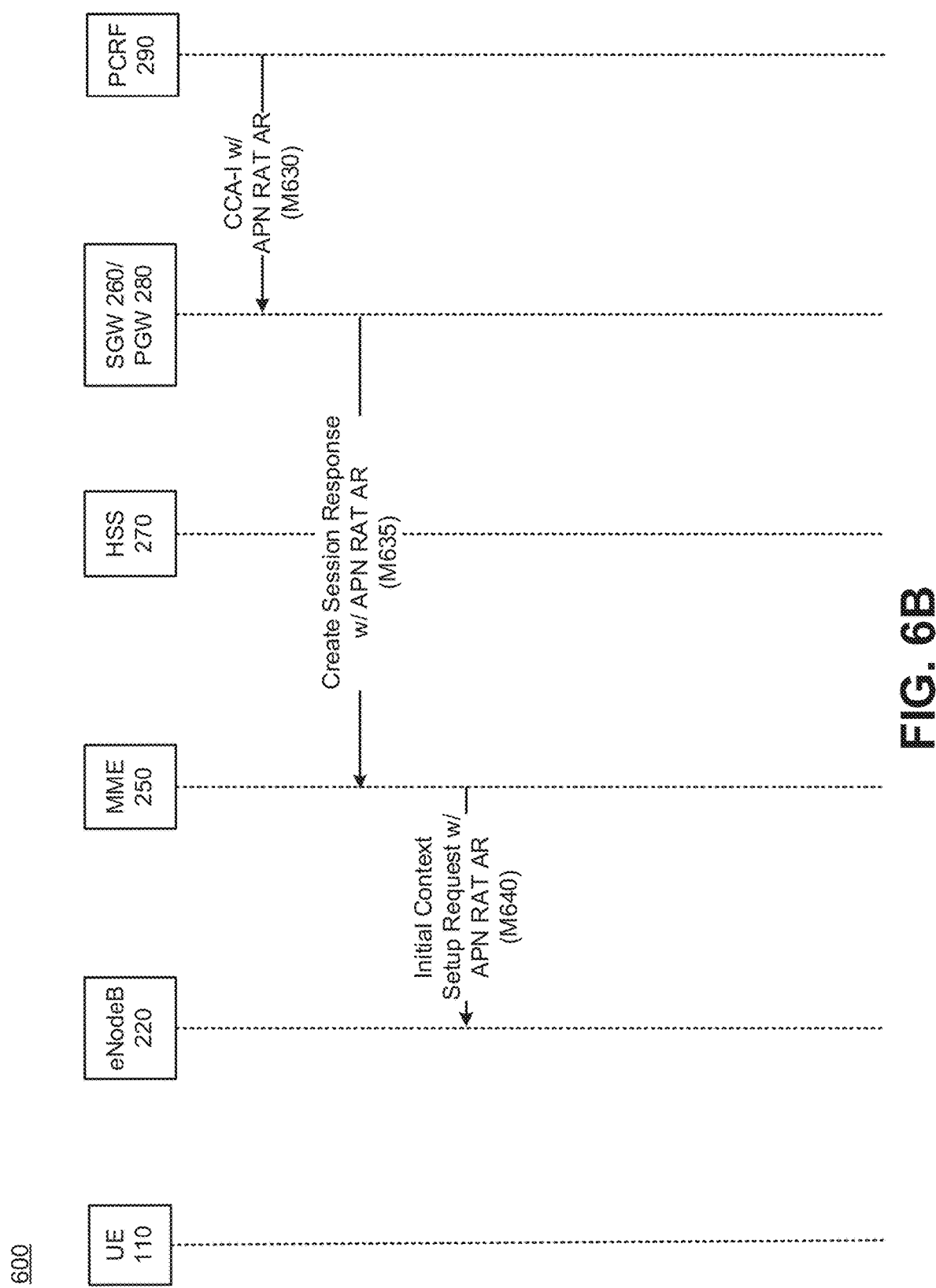

FIGS. 6A and 6B are diagrams showing exemplary message flows within networking system 200 for controlling the assignment of a default radio bearer during an attach procedure. Referring to FIG. 6A, UE 110 may initially send an attach request to MME 250 through eNodeB 220 via a wireless channel associated with primary RAT 215 (M605). The attach request may be received when UE 110 enters a service area associated with eNodeB 220. MME 250 may provide a location update request of UE 110 to HSS 270 over S6a interface 265 (M610). HSS 270 may respond over S6a interface 265, providing an update location response (M615). The update location response in message M615 may include an APN RAT access restriction (APN RAT AR) which is added to existing parameters of the APN Configuration parameter set. The APN RAT AR defines which RATs or types of RATs may be suitable for exchanging service data flows associated with devices specified by the APN. For example, the APN RAT AR may specify whether 5G or other RATs may be suitable to serve a particular APN. MME 250 may then provide a request to create a session to SGW 260 and/or PGW 280 via S11 interface 235 and/or S5/S8 interface 245 (M620). The create session request sent in message M620 may include the APN RAT AR. SGW 260 and/or PGW 280 may send a credit control request-initial (CCR-I) message to PCRF 290 over Gx interface 280 (M625). The CCR-I message may include the APN RAT AR. PCRF 290, based on policies and/or subscriber profile information in the subscriber profile repository (SPR) may decide to override the APN RAT AR generated by HSS 270.

Referring to FIG. 6B, PCRF 290 responds by sending a credit control answer-initial (CCA-I) to SGW 260 and/or PGW 280 over Gx interface 280 (M630). Message M630 may include the APN RAT AR, which may be modified if PCRF 290 determines to override the original APN RAT AR provided by HSS 270. SGW 260 and/or PGW 280 may send a create session response back to MME 250 via S11 interface 235 and/or S5/S8 interface 245 (M635). Message M635 may pass access restriction information at a bearer level, thus specifying the RAT 215/217 which may support the radio bearer. MME 250 may pass the access restriction information at the bearer level to eNodeB 220 (M640). EnodeB will use the information in message M640 to select the RAT 215/217 for the radio bearer that will exchange data flows with the device associated with the APN.

FIG. 7 is a diagram showing exemplary message flows between MN eNodeB 220 and SN gNodeB 230 within networking system 200 for assigning bearers to SN gNodeB 230. Initially, MN eNodeB 220 receives APN RAT AR information from MME 250, for example, as shown in message M640 in the embodiment depicted in FIG. 6B (Block 710). MN eNodeB 220 may then evaluate the received APN RAT AR, and/or local policies that may define how radio bearers may be assigned to RATs 215/217 (block 720). MN eNodeB 220 may alter or override the APN RAT AR information by executing local logic which may determine radio bearer assignments based on QCI and/or ARP-PL. If MN eNodeB 220 determines that one or more radio bearers will be assigned to RAT 217, MN eNodeB 220 may send a secondary node addition request to SN gNodeB 230 (M705). Message M705 may include one or more bearer IDs to identify the radio bearers to SN gNodeB 230. SN gNodeB 230 may respond by sending a secondary node addition response to MN eNodeB 220 in response to the request in message M705 (M710). Once the first set of radio bearers associated with RAT 215 have been setup, the second set of radio bearers associated with secondary RAT 217 may be setup based on 5G standards. Referring to FIG. 7, eNodeB 220, which is serving as a master eNodeB (MN), may send a secondary node (SN) addition request to gNodeB 230 (M705), and gNodeB 230 may respond with an acknowledgment that it is available to serve as a SN (M710). Once the radio bearers are established on secondary RAT 217, the UE 110 may exchange service flows with the devices associated with the APNs identified in APN RAT AR.

Figure 8:
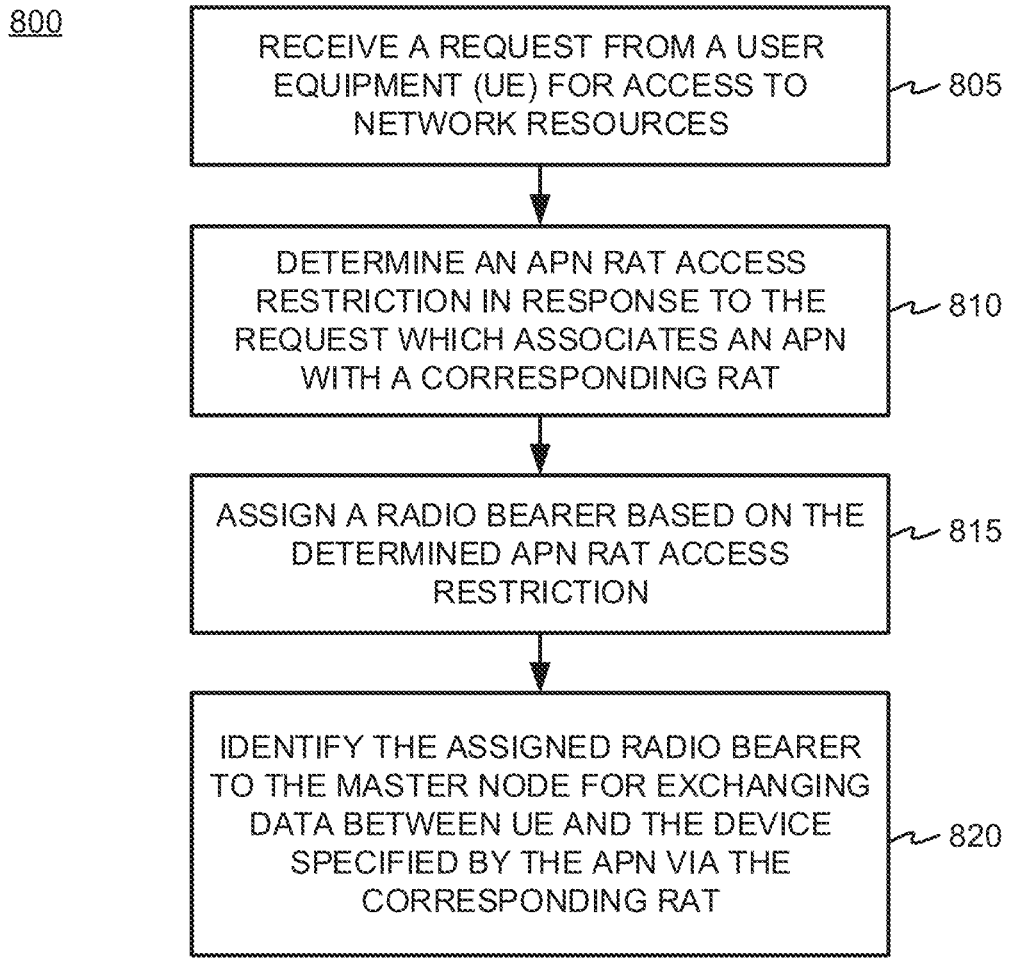
FIG. 8 is a flow chart showing an exemplary process for bearer control for secondary RATs in dual connectivity networks which may be performed by a network device.

FIG. 8 is a flow chart showing an exemplary process 800 for bearer control for secondary RATs in dual connectivity networks. Process 800 may be performed by a network device in core network 140. In network environment 200 shown in FIG. 2, process 800 may be performed by processor 510 within network device 500 executing instructions stored in memory 530, and/or mass storage device 540. In an embodiment, network device 500 may include, for example, MME 250, HSS 270, PCRF 290, PGW 260 and/or SGW 280.

Referring to FIG. 8, the network device in core network 140 may receive a request for access to network resources from UE 110 (Block 805). As shown in FIG. 1, core network 140 may be functionally coupled to primary RAT 115 and secondary RAT 117.

The network device may determine an APN RAT AR in response to the requested received in Block 805 (Block 810). The APN RAT AR may associate an APN with a corresponding RAT, wherein the corresponding RAT may include primary RAT 115 and/or secondary RAT 117. The network device may assign a radio bearer based on the determined APN RAT AR (Block 815). The network device may identify the assigned radio bearer to MN 120. The assigned radio bearer may exchange data between the UE 110 and a device specified by the APN via the corresponding RAT (Block 820).

In an embodiment, eNodeB 220 may serve as MN 120 which may wirelessly communicating via the primary RAT 215 associated with an LTE network. GnodeB 230 may serve as SN 130 which wirelessly communicates via the secondary RAT 217. In an embodiment, the receiving in Block 805 may include receiving an attach request from UE 110 during an attach procedure. The assigning in Block 815 may include assigning a default radio bearer for UE 110 to access core network 140. Core network 140 may be an ePC 240 as shown in FIG. 2. In the embodiment, the determining in block 810 may include having the HSS 270 report the APN RAT AR to MME 250.

In another embodiment, the receiving in Block 805 may include receiving a request from UE 110 to activate an additional packet data network context. The assigning in Block 815 may include assigning a radio bearer associated with the additional packet data network context. In the embodiment, the determining in Block 810 may include HSS 270 and/or PCRF 290 reporting the APN RAT AR. In an embodiment, the assigned radio bearer may be a dedicated bearer. In another embodiment, MN 120 may modify the identified radio bearer assignments using local logic at MN 120 based on at least one of quality of service (QoS) class identifier (QCI) or allocation retention priority-priority levels (ARP-PLs).

The foregoing description of implementations provides illustration and description, but is not intended to be exhaustive or to limit the invention to the precise form disclosed. Various preferred embodiments have been described with reference to the accompanying drawings. It will be evident that modifications and changes may be made thereto, and additional embodiments may be implemented, without departing from the broader scope of the invention as set forth in the claims that follow. For example, while series of messages, states, and/or blocks have been described with regard to FIGS. 6A-8, the order of the messages, states, and/or blocks may be modified in other embodiments. Further, non-dependent messaging and/or processing blocks may be performed in parallel. The specification and drawings are accordingly to be regarded in an illustrative rather than restrictive sense.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    receiving, at a core network from a user equipment (UE) device, a request for access to network resources, wherein the core network is coupled to a primary radio access technology (RAT) and a secondary RAT;
    determining, at the core network, an access point name (APN) RAT access restriction in response to the received request, wherein the APN RAT access restriction is used to configure communications with an APN in the core network specifying how radio bearers are assigned to a corresponding RAT, wherein the corresponding RAT comprises at least one of the primary RAT or the secondary RAT;
    assigning, at the core network, a radio bearer based on the determined APN RAT access restriction, wherein the assigned radio bearer exchanges data via the corresponding RAT; and
    identifying, to a master node, the assigned radio bearer for exchanging data between the UE device and a device specified by the APN via the corresponding RAT.

2. The method of claim 1, wherein the master node comprises an eNodeB wirelessly communicating via the primary RAT associated with a Long Term Evolution (LTE) network, and the device is a secondary node that comprises a gNodeB wirelessly communicating via the secondary RAT associated with a 5G network.

3. The method of claim 2, wherein the receiving further comprises:
    receiving an attach request from the UE device during an attach procedure; and wherein the assigning further comprises:
    assigning a default radio bearer for the UE device to access the core network.

4. The method of claim 3, wherein the determining further comprises:
    reporting, by a home subscriber server (HSS), the APN RAT access restriction to a mobility management entity (MME).

5. The method of claim 2, wherein the receiving further comprises:
    receiving a request from the UE device to activate an additional packet data network context; and wherein the assigning further comprises:
    assigning a radio bearer associated with the additional packet data network context.

6. The method of claim 5, wherein the determining further comprises:
    reporting, by at least one of a home subscriber server (HSS) or a policy charging and rules function (PCRF), the APN RAT access restriction.

7. The method of claim 1, further comprising:
    modifying the identified radio bearer assignments using local logic at the master node based on at least one of quality of service class identifier (QCI) or allocation retention priority-priority levels (ARP-PLs).

8. A network device within a core network, comprising:
    a network interface;
    a memory configured to store instructions; and
    at least one processor coupled to the communication interface and the memory, wherein the at least one processor is configured to execute the instructions stored in the memory to:
        receive, from a user equipment (UE) device, a request for access to network resources, wherein the core network is coupled to a primary radio access technology (RAT) and a secondary RAT;
        determine an access point name (APN) RAT access restriction in response to the received request, wherein the APN RAT access restriction is used to configure communications with an APN in the core network specifying how radio bearers are assigned to a corresponding RAT, wherein the corresponding RAT comprises at least one of the primary RAT or the secondary RAT;
        assign a radio bearer based on the determined APN RAT access restriction, wherein the assigned radio bearer exchanges data via the corresponding RAT; and
        identify, to a master node, the assigned radio bearer for exchanging data between the UE device and a device specified by the APN via the corresponding RAT.

9. The network device of claim 8, wherein the master node comprises an eNodeB wirelessly communicating via the primary RAT associated with a Long Term Evolution (LTE) network, and the device is a secondary node that comprises a gNodeB wirelessly communicating via the secondary RAT associated with a 5G network.

10. The network device of claim 9, wherein the instructions for receiving further cause the at least one processor to:
    receive an attach request from the UE device during an attach procedure; and wherein the instructions for assigning further cause the processor to:
    assign a default radio bearer for the UE device to access the core network.

11. The network device of claim 10, wherein the instructions for determining further cause the at least one processor to:
    report the APN RAT access restriction to a mobility management entity (MME).

12. The network device of claim 9, wherein the instructions for receiving further cause the at least one processor to:
    receive a request from the UE device to activate an additional packet data network context; and
    wherein the instructions for assigning further cause the at least one processor to:
    assign a radio bearer associated with the additional packet data network context.

13. The network device of claim 12, wherein the instructions for determining further cause the at least one processor to:
    report, by at least one of a home subscriber server (HSS) or a policy charging and rules function (PCRF), the APN RAT access restriction.

14. The network device of claim 13, wherein the assigned radio bearer is a dedicated bearer.

15. A non-transitory computer-readable medium comprising instructions, which, when executed by at least one processor within a core network, cause the at least one processor to:
- receive, from a user equipment (UE) device, a request for access to network resources, wherein the core network is coupled to a primary radio access technology (RAT) and a secondary RAT;
- determine an access point name (APN) RAT access restriction in response to the received request, wherein the APN RAT access restriction is used to configure communications with an APN in the core network specifying how radio bearers are assigned to a corresponding RAT, wherein the corresponding RAT comprises at least one of the primary RAT or the secondary RAT;
- assign a radio bearer based on the determined APN RAT access restriction, wherein the assigned radio bearer exchanges data via the corresponding RAT; and
- identify, to a master node, the assigned radio bearer for exchanging data between the UE device and a device specified by the APN via the corresponding RAT.

16. The non-transitory computer-readable medium of claim 15, wherein the master node comprises an eNodeB wirelessly communicating via the primary RAT associated with a Long Term Evolution (LTE) network, and the device is a secondary node that comprises a gNodeB wirelessly communicating via the secondary RAT associated with a 5G network.

17. The non-transitory computer-readable medium of claim 16, wherein the instructions for receiving further cause the at least one processor to:
- receive an attach request from the UE device during an attach procedure; and wherein the instructions for assigning further cause the at least one processor to:
- assign a default radio bearer for the UE device to access the core network.

18. The non-transitory computer-readable medium of claim 17, wherein the instructions for determining further cause the at least one processor to:
- report, by a home subscriber server (HSS), the APN RAT access restriction to a mobility management entity (MME).

19. The non-transitory computer-readable medium of claim 16, wherein the instructions for receiving further cause the at least one processor to:
- receive a request from the UE device to activate an additional packet data network context; and
- wherein the instructions for assigning further cause the at least one processor to:
- assign a radio bearer associated with the additional packet data network context.

20. The non-transitory computer-readable medium of claim 19, wherein the instructions for determining further cause the at least one processor to:
- report, by at least one of a home subscriber server (HSS) or a policy charging and rules function (PCRF), the APN RAT access restriction.

* * * * *